(12) United States Patent
Balamane et al.

(10) Patent No.: US 9,099,111 B2
(45) Date of Patent: Aug. 4, 2015

(54) HEAT ASSISTED MAGNETIC RECORDING HEAD EMPLOYING NOBLE METAL ALLOY AS DIFFUSION BARRIER LAYER

(71) Applicant: HGST Netherlands B.V., Amsterdam (NL)

(72) Inventors: Hamid Balamane, Portola Valley, CA (US); Vijay Prakash Singh Rawat, San Jose, CA (US); Matteo Staffaroni, Pleasanton, CA (US); Barry C. Stipe, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/133,003

(22) Filed: Dec. 18, 2013

(65) Prior Publication Data
US 2015/0170683 A1 Jun. 18, 2015

(51) Int. Cl.
*G11B 5/31* (2006.01)
*G11B 5/00* (2006.01)

(52) U.S. Cl.
CPC ........ *G11B 5/314* (2013.01); *G11B 2005/0021* (2013.01)

(58) Field of Classification Search
USPC ........................................ 360/125.32, 125.75
See application file for complete search history.

(56) References Cited

U.S. PATENT DOCUMENTS

| | | | |
|---|---|---|---|
| 7,187,520 B2 | 3/2007 | Lee et al. | |
| 7,239,481 B2 | 7/2007 | Lille et al. | |
| 7,880,996 B2 | 2/2011 | Stipe | |
| 8,339,740 B2 | 12/2012 | Zou et al. | |
| 8,351,151 B2 * | 1/2013 | Katine et al. | 360/110 |
| 8,498,182 B1 * | 7/2013 | Balamane et al. | 369/13.33 |
| 2012/0105996 A1 * | 5/2012 | Katine et al. | 360/59 |
| 2012/0127839 A1 | 5/2012 | Rawat et al. | |
| 2012/0147716 A1 | 6/2012 | Hara et al. | |
| 2013/0070576 A1 | 3/2013 | Zou et al. | |

\* cited by examiner

*Primary Examiner* — Wayne Young
*Assistant Examiner* — Carlos E Garcia
(74) *Attorney, Agent, or Firm* — Patterson & Sheridan, LLP

(57) ABSTRACT

The present invention generally relates to a HAMR head. An insulating layer isolates the NFT from the magnetic lip of the magnetic pole. A noble metal alloy diffusion barrier layer is present between the insulating layer and the magnetic lip to prevent diffusion from the insulating layer into the magnetic lip. The noble metal alloy has a melting point of greater than about 1065 degrees Celsius, and the noble metals may be selected from Au, Pt, Ir, Re and Ru. The alloying elements comprise less than 10 percent of the alloy. The alloying elements can include Rh, W, Mo, Ni, Pt, Co, B, Ru and combinations thereof. The diffusion barrier layer may surround the magnetic lip, may surround the insulating layer, or may simply be at the interface of the insulating layer and the magnetic lip.

25 Claims, 10 Drawing Sheets

HEAT ASSISTED MAGNETIC RECORDING HEAD EMPLOYING NOBLE METAL ALLOY AS DIFFUSION BARRIER LAYER

BACKGROUND OF THE INVENTION

1. Field of the Invention

Embodiments of the present invention generally relate to a heat assisted magnetic recording (HAMR) head.

2. Description of the Related Art

Higher storage bit densities in magnetic media used in disk drives have reduced the size (volume) of magnetic bits to the point where the magnetic bit dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the operational temperature of magnetic hard drive. Lowering the temperature may not always be practical when designing hard disk drives for commercial and consumer use. Raising the coercivity, on the other hand, will make it challenging for current write heads to do the recording.

One additional solution has been proposed, which uses magnetic media with high coercivity without the need to increase the magnetic moment of the write pole material. The solution heats up a localized area on the media to a temperature above the Curie temperature, thereby, lowering the effective coercivity of the localized region and thus, enabling writing with current write heads within this heated region. The data state becomes "fixed" once the media cools below the Curie temperature. This technique is broadly referred to as "thermally assisted (magnetic) recording" (TAR or TAMR), "energy assisted magnetic recording" (EAMR), or HAMR which are used interchangeably herein. It can be applied to longitudinal and perpendicular recording systems as well as "bit patterned media". Heating of the media surface has been accomplished by a number of techniques such as focused laser beams or near-field optical sources.

While the laser beam or the near-field optical source is positioned to induce heating in the magnetic media, a certain percentage of heat will also be generated in the magnetic head. This heating can affect the shape of the head at the air bearing surface (ABS), and therefore impact the fly height. Heating of the head can also impact the reliability and performance of the head because high temperatures can accelerate thermal migration of various films and structures, causing inter-diffusion and dimensional changes.

The primary areas of the HAMR write head that get hot are the near-field transducer (NFT) and magnetic pole placed proximate to the NFT. The insulating material of the aperture between the NFT and the magnetic pole can diffuse into the magnetic pole and cause device failure.

Therefore, there is a need in the art for an improved write head for HAMR.

SUMMARY OF THE INVENTION

The present invention generally relates to a HAMR head. An insulating layer isolates the NFT from the magnetic lip of the magnetic pole. A noble metal alloy diffusion barrier layer is present between the insulating layer and the magnetic lip to prevent diffusion from the insulating layer into the magnetic lip. The noble metal alloy has a melting point of greater than about 1065 degrees Celsius, and the noble metals may be selected from Au, Pt, Ir, Re and Ru. The alloying element comprises less than 10 percent of the alloy, and the alloying element should be immiscible in the noble metal. The diffusion barrier layer may surround the magnetic lip, may surround the insulating layer, or may simply be at the interface of the insulating layer and the magnetic lip.

In one embodiment, a HAMR head comprises an antenna having a notch; an insulating layer disposed on the antenna; a diffusion barrier layer disposed on the insulating layer, wherein the diffusion barrier layer comprises a noble metal alloy; and a magnetic lip comprising a magnetic material disposed on the diffusion barrier layer.

In another embodiment, a HAMR head comprises an antenna having a notch; an insulating layer disposed on the antenna; a diffusion barrier layer disposed on the insulating layer and the antenna, wherein the diffusion barrier layer comprises a noble metal alloy; and a magnetic lip comprising a magnetic material disposed on the diffusion barrier layer.

In another embodiment, a HAMR head comprises an antenna having a notch; an insulating layer disposed on the antenna; a conductive layer disposed on the insulating layer, wherein the conductive layer has an opening therethrough; a diffusion barrier layer disposed on the insulating layer within the opening of the conductive layer and on the conductive layer bordering the opening, wherein the diffusion barrier layer comprises a noble metal alloy; and a magnetic lip comprising a magnetic material disposed on the diffusion barrier layer and within the opening.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to a HAMR head. An insulating layer isolates the NFT from the magnetic lip of the magnetic pole. A noble metal alloy diffusion barrier layer is present between the insulating layer and the magnetic lip to prevent diffusion from the insulating layer into the magnetic lip. The noble metal alloy has a melting point of greater than about 1065 degrees Celsius, and the noble metals may be selected from Au, Pt, Ir, Re and Ru. The alloying element comprises less than 10 percent of the alloy. The diffusion barrier layer may surround the magnetic lip, may surround the insulating layer, or may simply be at the interface of the insulating layer and the magnetic lip.

Figure 1A:
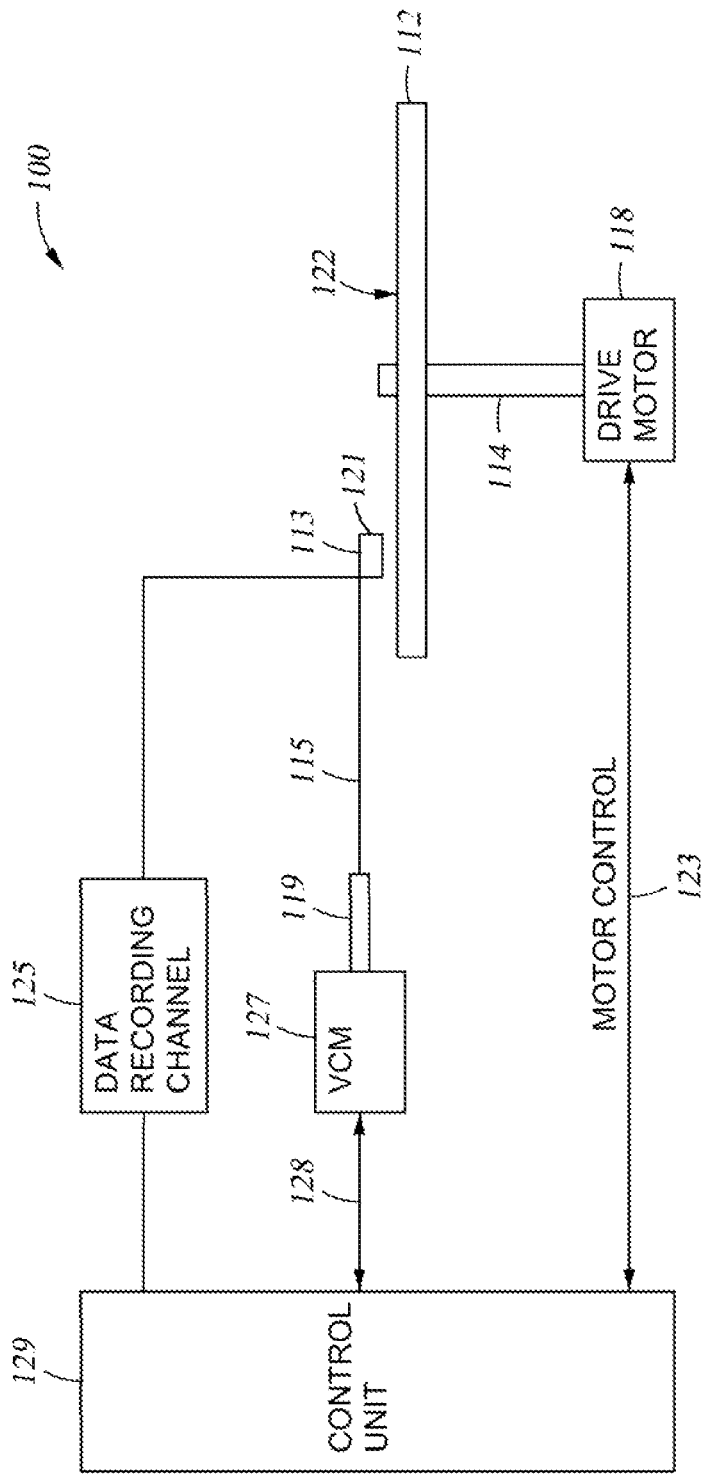
FIGS. 1A and 1B illustrate a disk drive system, according to embodiments described herein.

FIG. 1A illustrates a disk drive 100 embodying the invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser, LED or electrically resistive heater) for heating the disk surface 122. As the magnetic disk rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 towards the disk surface 122. Each actuator arm 119 is attached to an actuator means 127. The actuator means 127 as shown in FIG. 1A may be a voice coil motor (VCM). The VCM comprises a coil movable within a fixed magnetic field, the direction and speed of the coil movements being controlled by the motor current signals supplied by control unit 129.

During operation of a HAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 slightly above the disk 112 surface by a small, substantially constant spacing during normal operation. The radiation source heats up the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

Figure 1B:
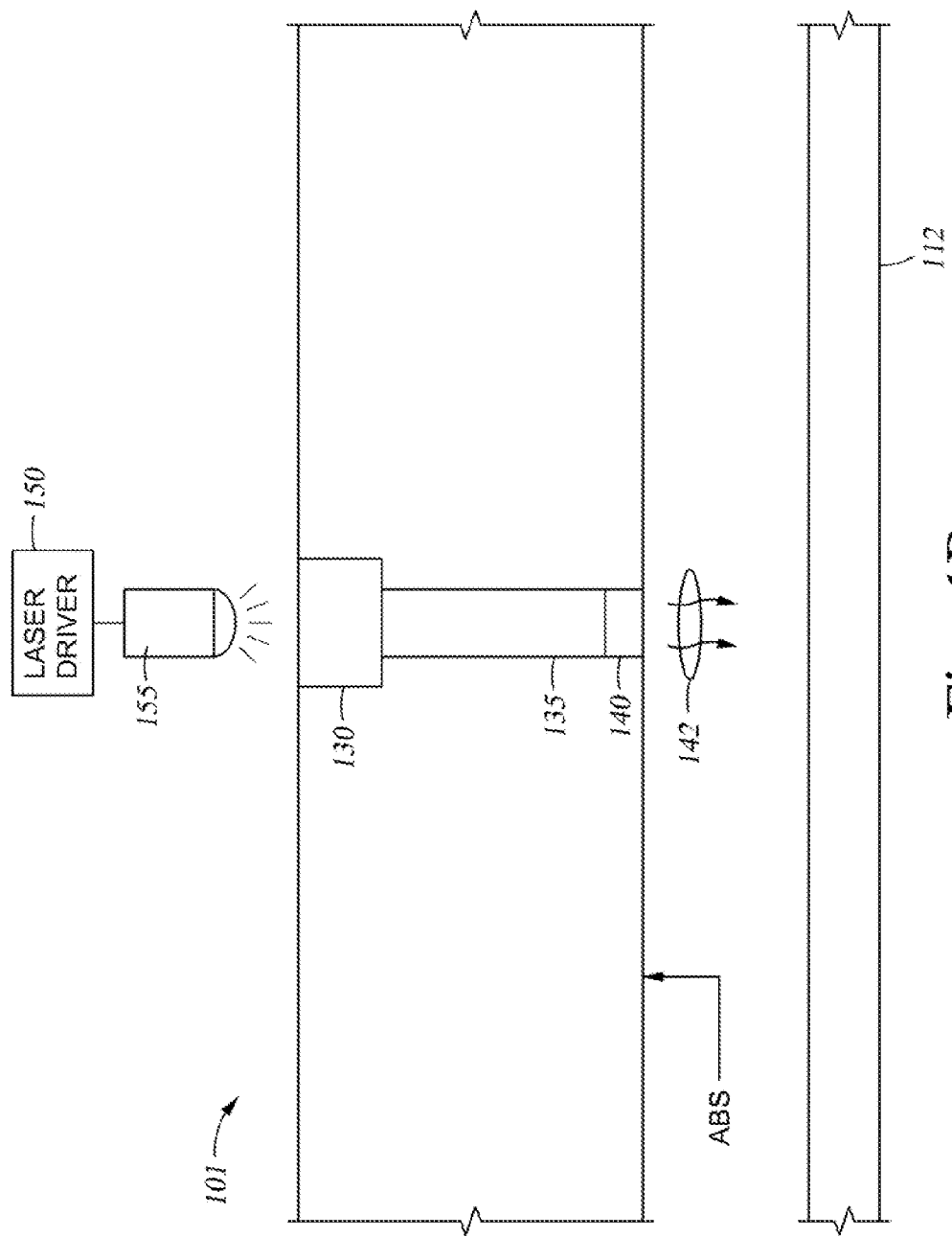

FIG. 1B is a cross sectional schematic of a HAMR enabled write head 101, according to one embodiment described herein. The head 101 is operatively attached to a laser 155 (i.e., a radiation source) that is powered by a laser driver 150. The laser 155 may be placed directly on the head 101 or radiation may be delivered from a laser 155 located separate from the slider through an optical fiber or waveguide. Similarly, the laser driver 150 circuitry may be located on the slider 113 or on a system-on-chip (SOC) associated with the disk drive 100 such as the control unit 129 as shown in FIG. 1A. The head 101 includes a spot-size converter 130 for focusing the radiation transmitted by the laser 155 into the waveguide 135. In another embodiment, the head 101 may include one or more lens for focusing the beamspot of the laser 155 before the emitted radiation reaches the spot-size converter 130. The waveguide 135 is a channel that transmits the radiation through the height of the head 101 to a NFT 140—e.g., a plasmonic device or optical transducer—which is located at or near the air-bearing surface (ABS). The NFT 140 further focuses the beamspot to avoid heating neighboring tracks of data on the disk 112—i.e., creates a beamspot much smaller than the diffraction limit. As shown by arrows 142, this optical energy is emitted from the NFT 140 to the surface of the disk 112 below the ABS of the head 101. The embodiments herein, however, are not limited to any particular type of radiation source or technique for transferring the energy emitted from the radiation source to the ABS.

Figure 2:
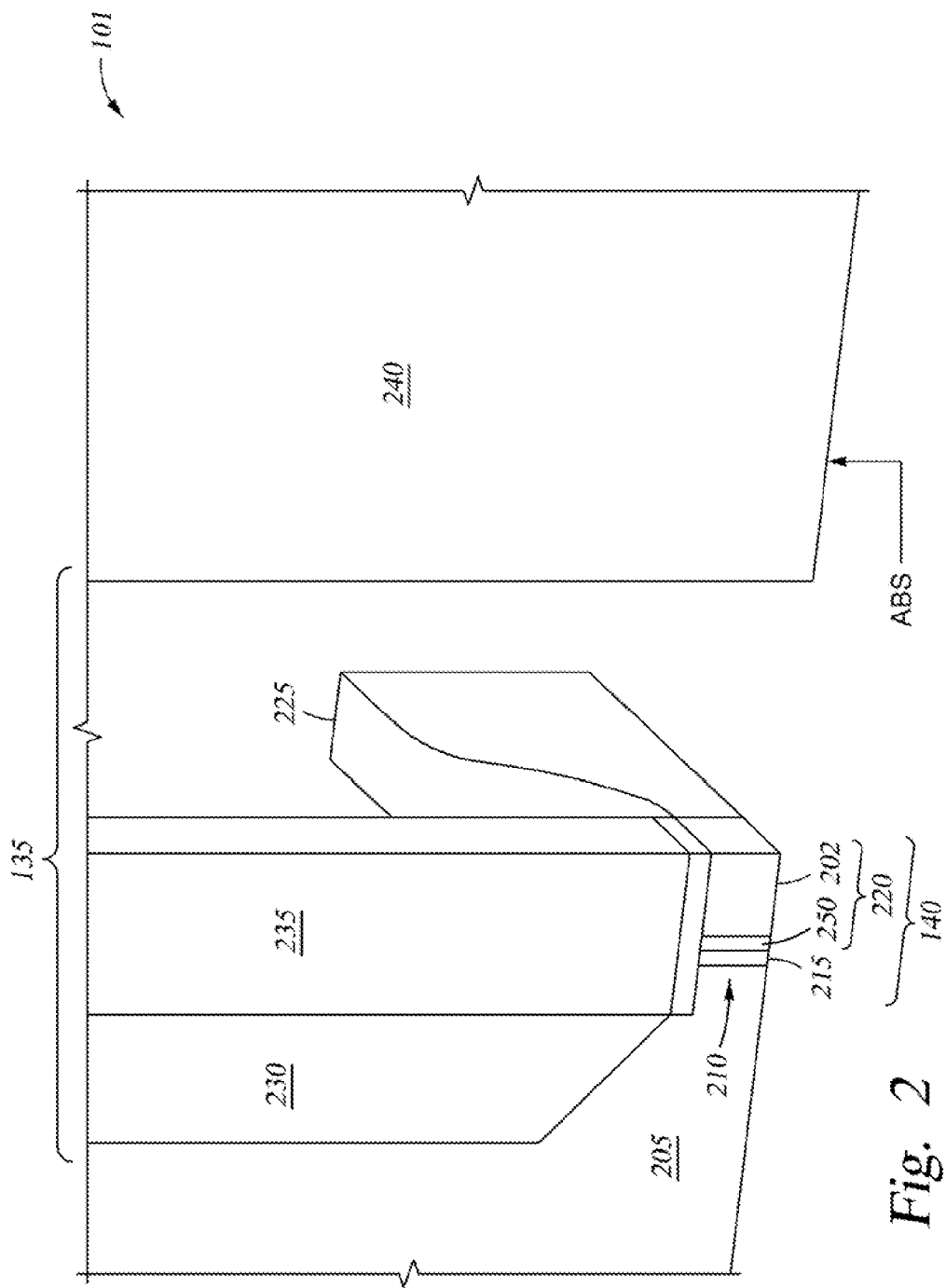
FIG. 2 illustrates a cross-sectional schematic diagram of a HAMR enabled head, according to one embodiment described herein.

FIG. 2 illustrates a cross-sectional schematic diagram of the HAMR enabled head 101, according to one embodiment of the invention. As shown, this portion of the head 101 includes the waveguide 135, which consists of waveguide core 235 and waveguide cladding 230, but with some of the cladding 230 (and any cladding on the back-side of the head 101) removed to better illustrate the details of heat sink 225. The NFT 140 may be directly or thermally coupled to the heat sink 225 for removing excess heat from the NFT 140. Because FIG. 2 is a cross-section of head 101, there may be another heat sink located opposite the heat sink 225 depicted. The return pole 240 is located between the NFT 140 and shield layers or the read pole which are not shown in this figure.

In one embodiment, the write pole 205 includes a magnetic lip 210 portion that may extend underneath the core 235 of the waveguide 135. The placement of magnetic lip 210 close to the NFT 140 aids in bringing magnetic flux close to the optical field generated by the NFT onto the magnetic media.

The core 235 (and the waveguide 135) may terminate at the NFT 140. The NFT 140 at least includes an antenna 220 and an aperture 215. The antenna 220 comprises two components, a base layer 202 and a patterned channel 250 on top of the base layer 202. The patterned channel 250 will be illustrated and discussed in detailed with regards to FIGS. 3-5. In some embodiments, because the design and/or material of the magnetic lip 210 may improve the efficiency of the antenna 220, the magnetic lip 210 may be considered as part of the NFT 140. The antenna 220 may be Au, Cu, Ag, Al or alloys comprising these elements. The aperture 215 is an opening that may be filled with low refractive index and optically transparent material such as, for example, SiO$_2$ or other dielectric material. In one embodiment, the aperture 215 may comprise of the same material as the cladding 230. The write pole 205 and magnetic lip 210 may comprise of Ni, Co, Fe, Cr, or some combination or alloy thereof. The NFT 140 uses the antenna 220 and aperture 215 to further focus the optical energy delivered by the waveguide 135 onto the magnetic media.

Figure 3A:
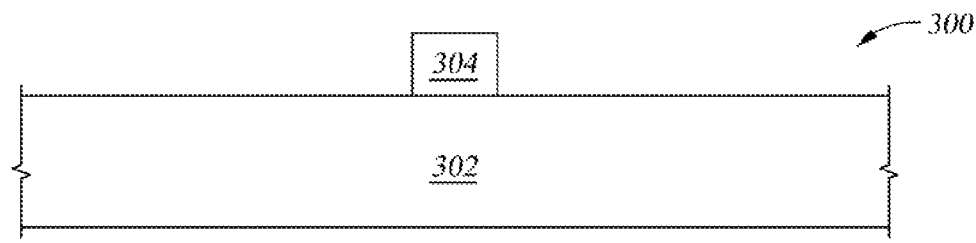
FIGS. 3A-3H are schematic illustrations of a magnetic head at various stages of production according to one embodiment.
Figure 3B:
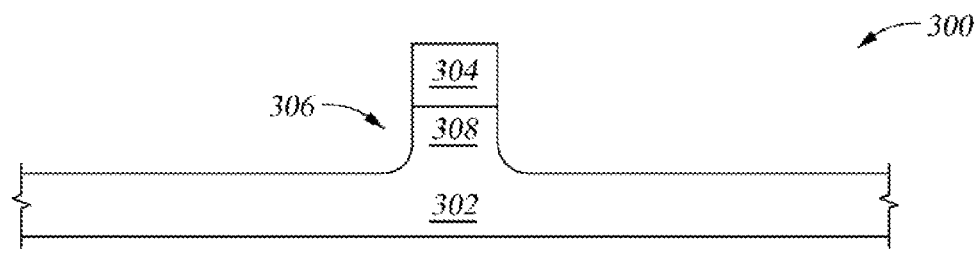

FIGS. 3A-3H are schematic illustrations of a magnetic head 300 at various stages of production according to one embodiment. FIG. 3A shows a base layer 302 that is made of a noble metal. In one embodiment, the noble metal is gold. The base layer 302 is about 200 nanometers (nm) and is deposited on a substrate that has a partially formed HAMR head disposed thereon. A mask 304 is disposed on a portion of the base layer 302, and portions of the base layer 302 not covered by the mask 304 are removed as shown in FIG. 3B, forming the base of the antenna 306. The removal process may be ion milling or reactive ion etching (RIE). The patterned notch or channel 308 along with the base layer 302 is the antenna 306. The antenna 306 may be the antenna 220 shown in FIG. 2. The antenna 306 has a base layer 302 and a notch 308, which serves as a focal point for the NFT 140. The notch 308 has a thickness of about 50 nm and the base of the antenna 306 has a thickness of about 150 nm. The width "of the notch 308 is about 50 nm. While not shown, a surface diffusion inhibitor layer may be deposited over the antenna 306 and notch 308.

Figure 3C:
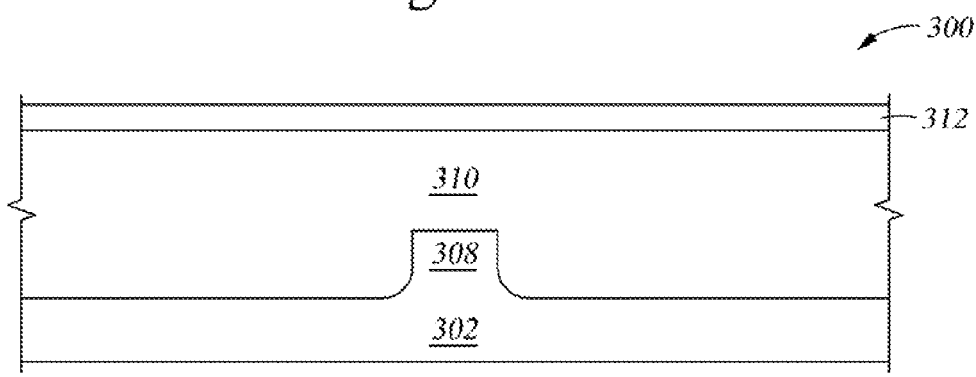

As shown in FIG. 3C, an insulating layer 310 is deposited over the antenna 306. The insulating layer 310 may comprise alumina or SiO$_2$. A diffusion barrier layer 312 is deposited onto the insulating layer 310. The diffusion barrier layer 312 is used to prevent/reduce diffusion of oxygen from the insulating layer 310 to the magnetic lip that will be formed later. The diffusion barrier layer 312 comprises a noble metal alloy. Suitable noble metals that may be used include Au, Pt, Ir, Re and Ru. The noble metal alloy contains an alloying element in an amount of less than 10 atomic percent. The alloying elements used in diffusion barrier layer 312 have melting points of greater than about 1065 degrees Celsius. Alloying elements that may be used include Rh, Ir, Ni, Co, W, Mo and Ru. Exemplary alloys include AuNi, AuRh, AuW, or AuMo. In one embodiment, more than one alloying element may be used. The diffusion barrier layer 312 has a thickness of between about 5 Angstroms and about 10 nm.

While shown as a single layer, it is contemplated that the diffusion barrier layer 312 may comprise a multilayer structure including a first adhesion layer formed on the insulating layer 310, the noble metal alloy layer formed on the first adhesion layer, and a second adhesion layer formed on the noble metal alloy layer. The first adhesion layer assures good adhesion between the noble metal alloy layer and the insulating layer 310. Similarly, the second adhesion layer assures good adhesion between the noble metal alloy layer and the magnetic lip to be formed later. Suitable adhesion layers include Cr, Ta, Ti, Hf, Zr, Si or alloys of these elements with Ni, such as NiTa, NiTi, NiCr, NiHf, or NiZr. The adhesion layers can have a thickness of between about 5 Angstroms and about 5 nm.

Figure 3D:
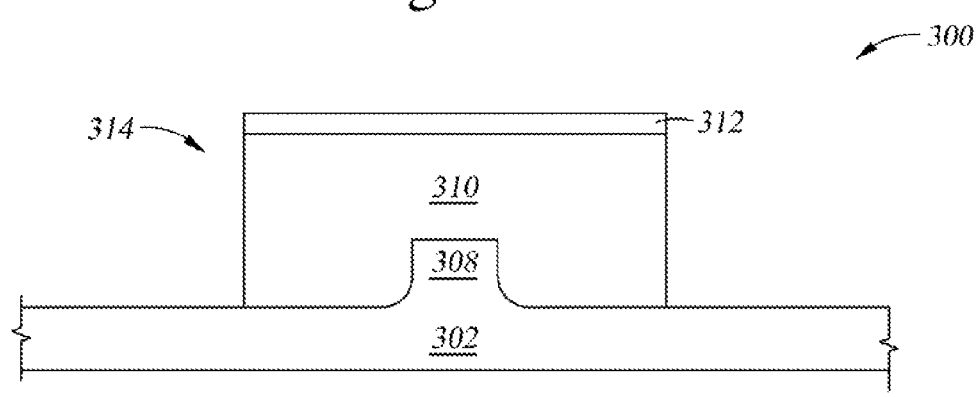
Figure 3E:
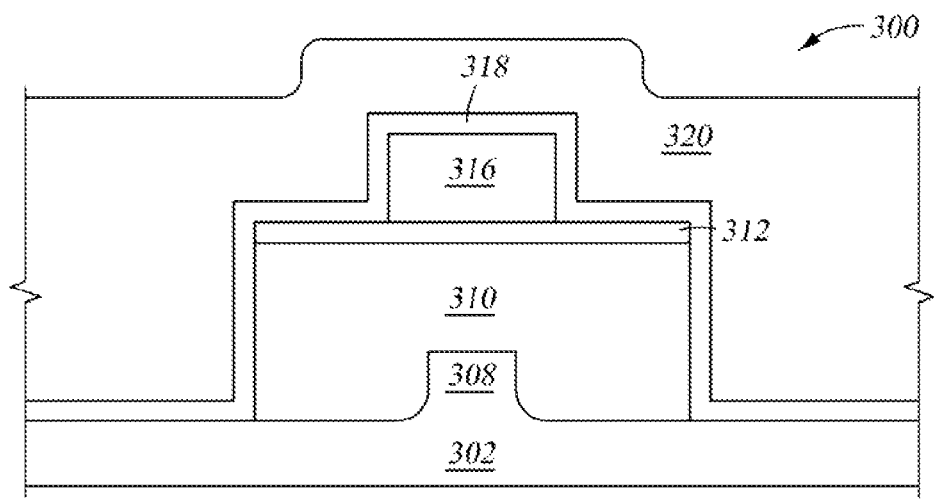

The diffusion barrier layer 312 and the insulating layer 310 are then patterned to form the aperture 314 as shown in FIG. 3D. A resist mask 316 and a conductive layer 318 are deposited over the antenna 306 and the aperture 314 as shown in FIG. 3E. The conductive layer 318 has good thermal conductivity and comprises a noble metal, such as Au, Rh, Ru, Ir, Pd, Pt, Re, or Os. The conductive layer 318 may also be an alloy having over 95% of one of the noble metals, such as Au, Rh, Ru, Ir, Pd, Pt, Re, or Os. The thickness of the conductive layer 318 may be less than or equal to 60 nm. In one embodiment, the thickness of the conductive layer 318 is about 10 nm. The conductive layer 318 may be formed using any suitable deposition process, such as off-angle sputtering or atomic layer deposition (ALD). Next, a heat sink 320 of cladding material is deposited over the conductive layer 318. The heat sink 320 is made of a material having good thermal conductivity, such as Cr, Ir, Pt, Pd, Ru, or Rh, and is deposited using any suitable deposition process, such as physical vapor deposition (PVD).

Figure 3F:
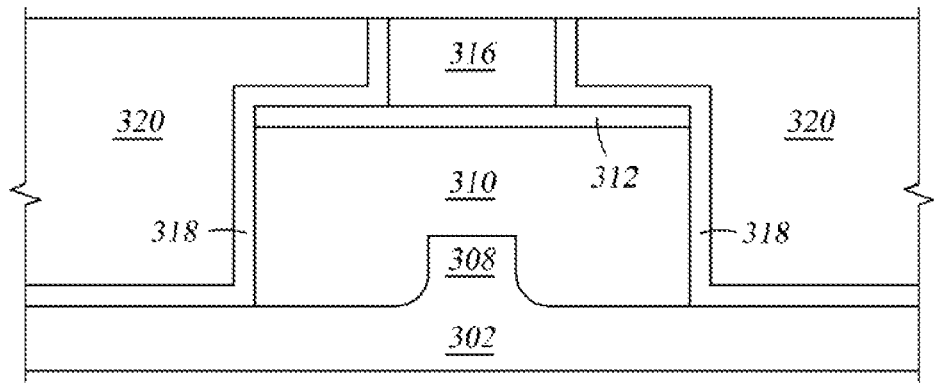
Figure 3G:
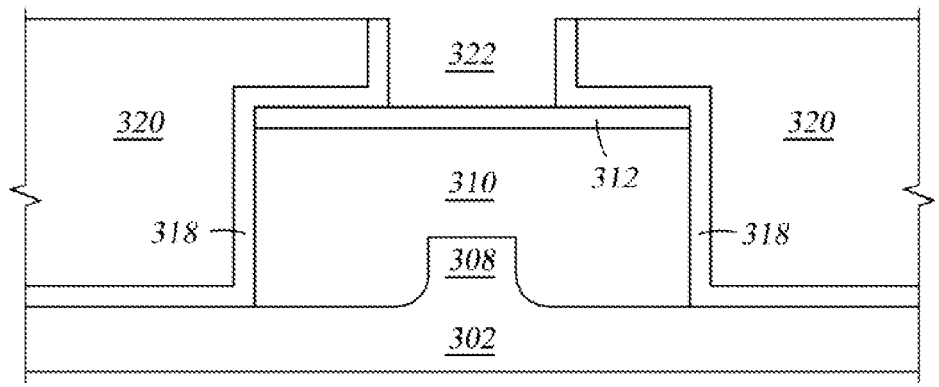

Thereafter, a subtractive process, such as a chemical mechanical polishing, is performed to expose the resist mask 316 as shown in FIG. 3F. The resist mask 316 is then removed to form an opening 322 and expose the diffusion barrier layer 312 as shown in FIG. 3G.

Figure 3H:
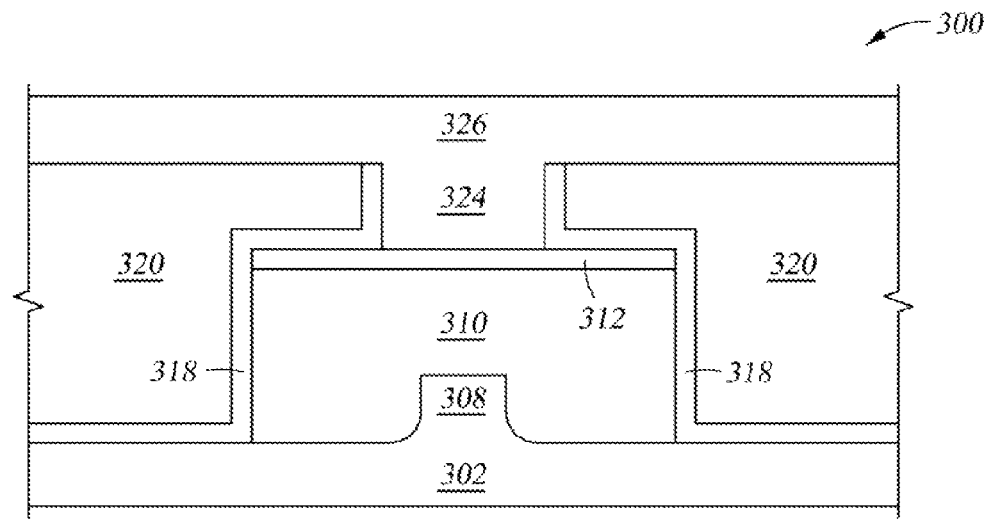

A magnetic material is deposited in the opening 322 and over the heat sink 320, as shown in FIG. 3H. In one embodiment, the magnetic material may comprise a ferromagnetic material such as CoFeNi. The portion of the magnetic material that is in the opening 322 is the magnetic lip 324 and the portion of the magnetic material that is over the heat sink 320 and the magnetic lip 324 is the write pole 326. The magnetic lip 324 and the write pole 326 may be the magnetic lip 210 and the write pole 205 in FIG. 2. The resulting magnetic head 300 as shown in FIG. 3H has the diffusion barrier layer 312 disposed on the insulating layer 310 to isolate the insulating layer 310 from the magnetic lip 324. In the embodiment shown in FIGS. 3A-3H, the diffusion barrier layer 312 is formed only on the surface of the insulating layer 310 that is opposite the notch 308 and not on the sidewalls of the insulating layer 310.

Figure 4A:
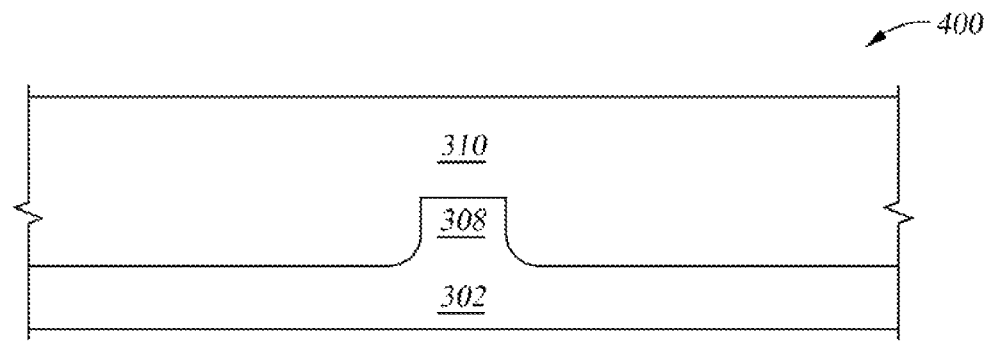
FIGS. 4A-4F are schematic illustrations of a magnetic head at various stages of production according to another embodiment.
Figure 4B:
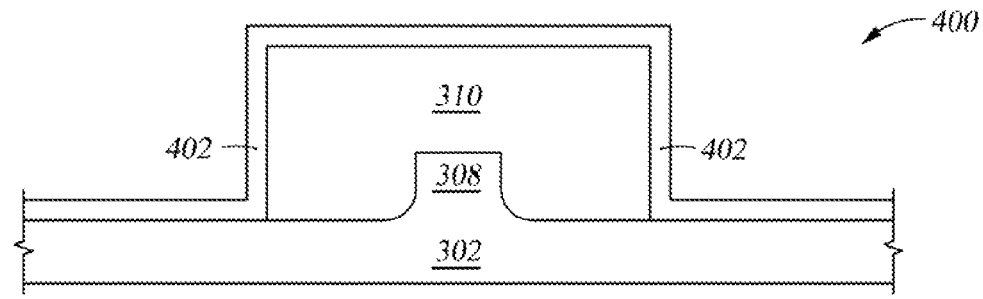

FIGS. 4A-4F are schematic illustrations of a magnetic head 400 at various stages of production according to another embodiment. The head is fabricated by forming the antenna 306 having the base layer 302 and notch 308 as discussed above with regard to FIGS. 3A-3H. The insulating layer 310 is then formed thereover as shown in FIG. 4A. The insulating layer 310 is then patterned as shown in FIG. 4B and the diffusion barrier layer 402 is formed thereover. The diffusion barrier layer 402 may be deposited in the same manner, to the same thickness and using the same materials as discussed above with regards to diffusion barrier layer 312. However, the diffusion barrier layer 402 is formed not only on the surface of the insulating layer 310 that is opposite the notch 308, but also on the sidewalls of the insulating layer 310 and the antenna 306.

Figure 4C:
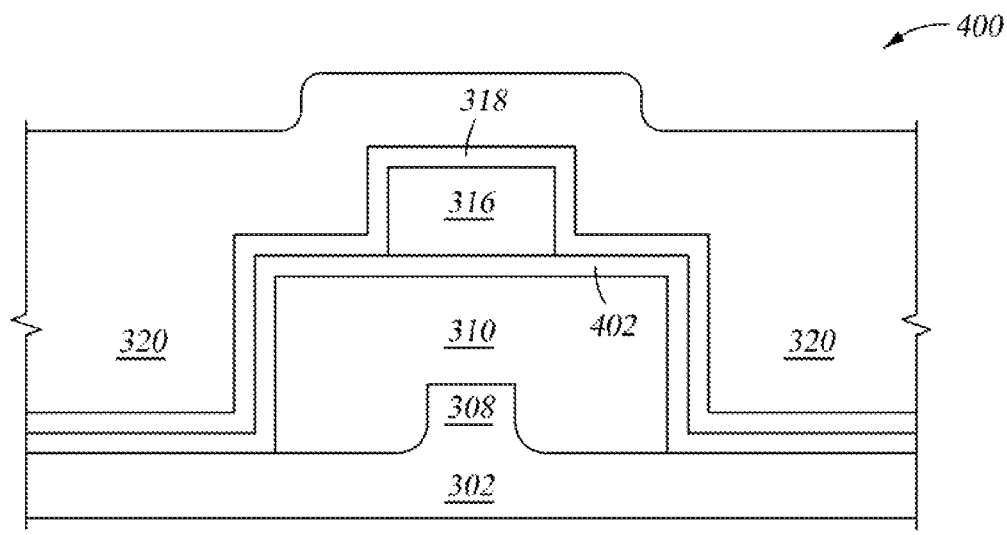
Figure 4D:
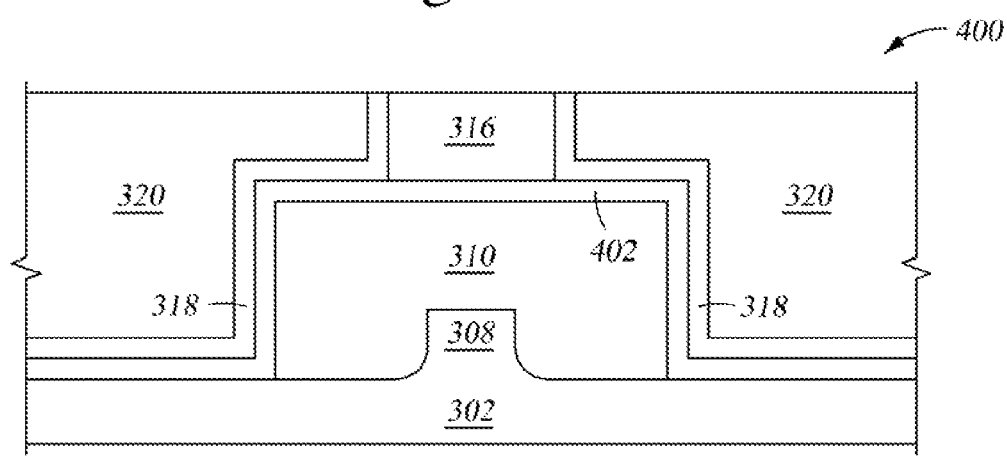
Figure 4E:
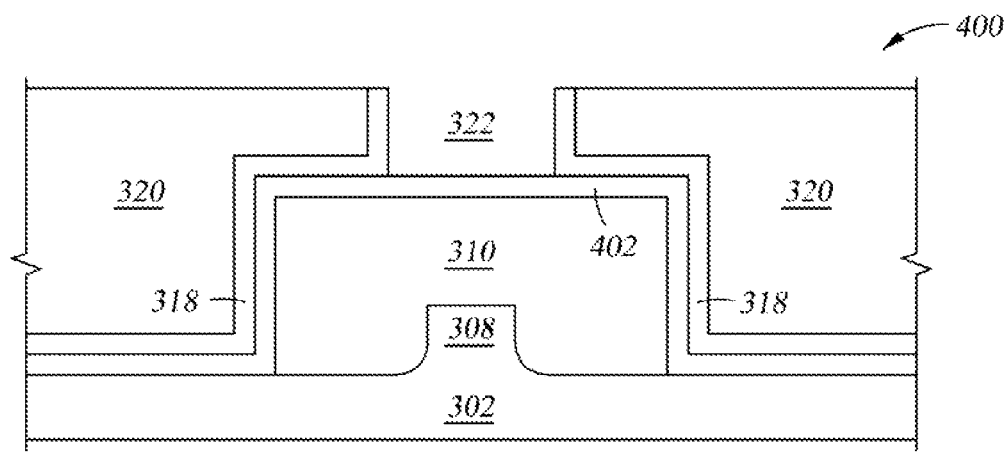
Figure 4F:
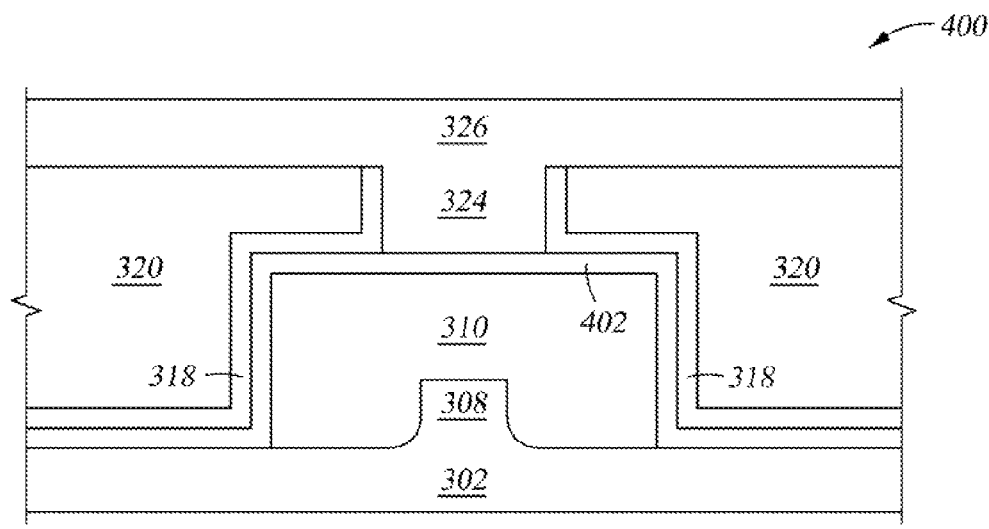

Following formation of the diffusion barrier layer 402, the resist mask 316, the conductive layer 318, and the heat sink 320 are formed as shown in FIG. 4C. A subtractive process, such as CMP or ion milling, is performed to expose the resist mask 316 as shown in FIG. 4D. The resist mask 316 is then removed as shown in FIG. 4E and the magnetic material is deposited as shown in FIG. 4F such that the write pole 326 and magnetic lip 324 are formed.

Figure 5A:
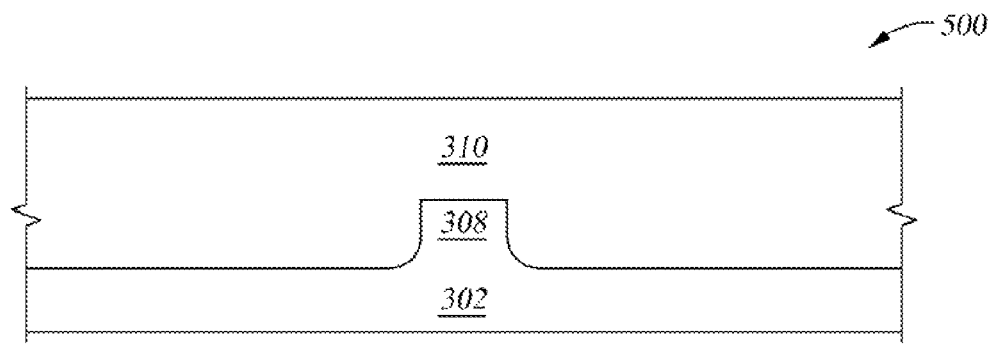
FIGS. 5A-5G are schematic illustrations of a magnetic head at various stages of production according to another embodiment.
Figure 5B:
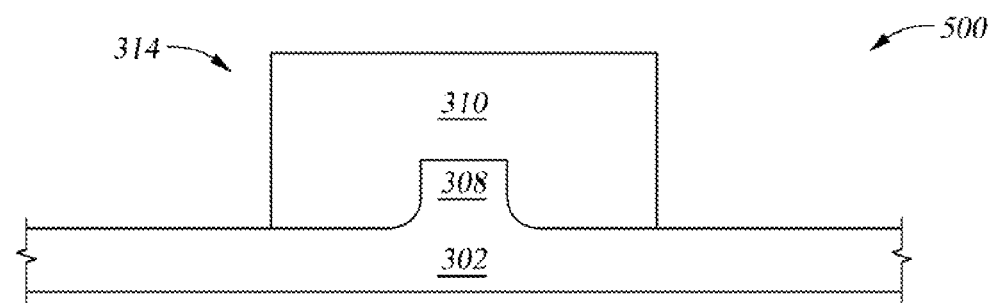
Figure 5C:
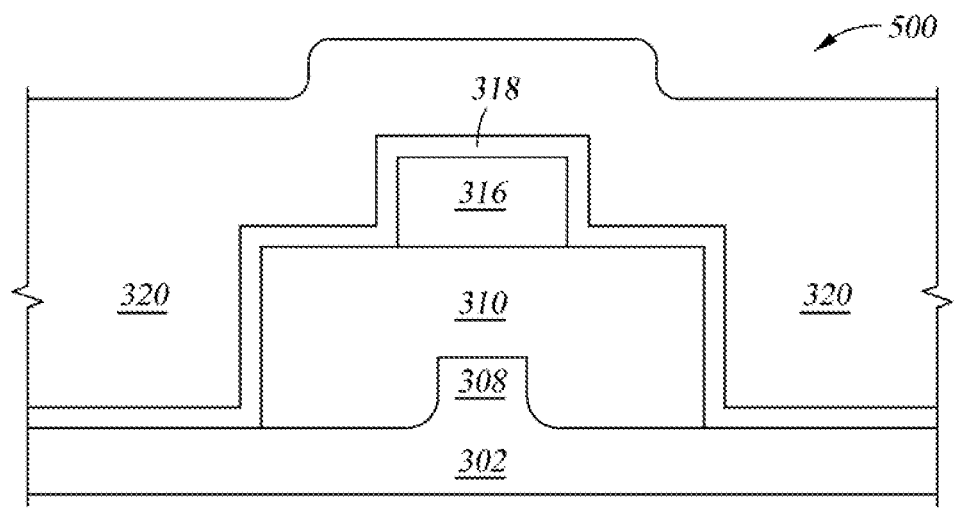
Figure 5D:
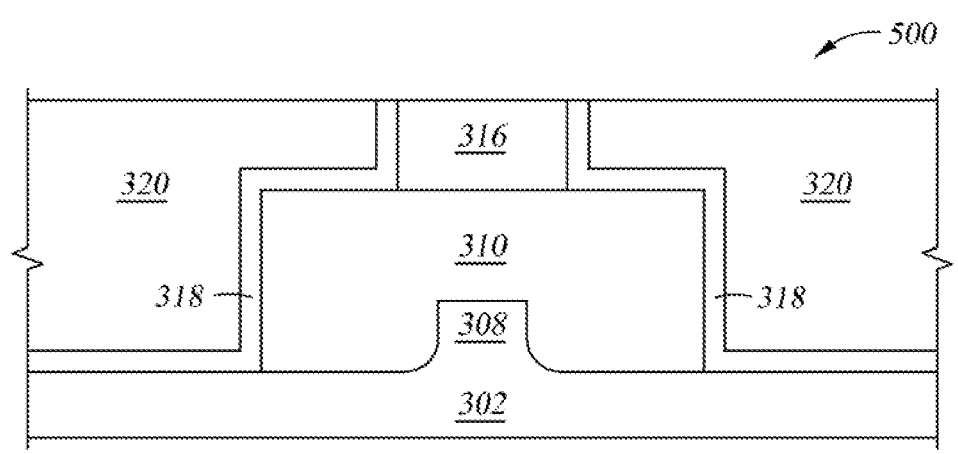
Figure 5E:
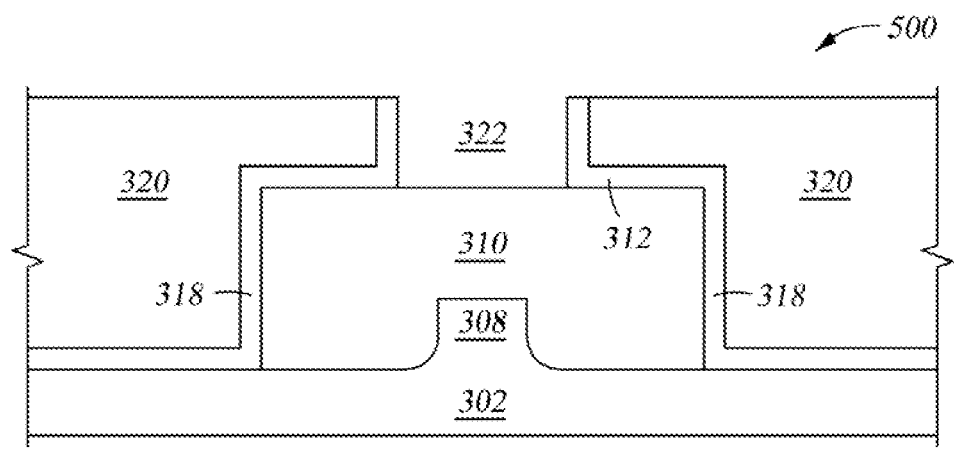
Figure 5F:
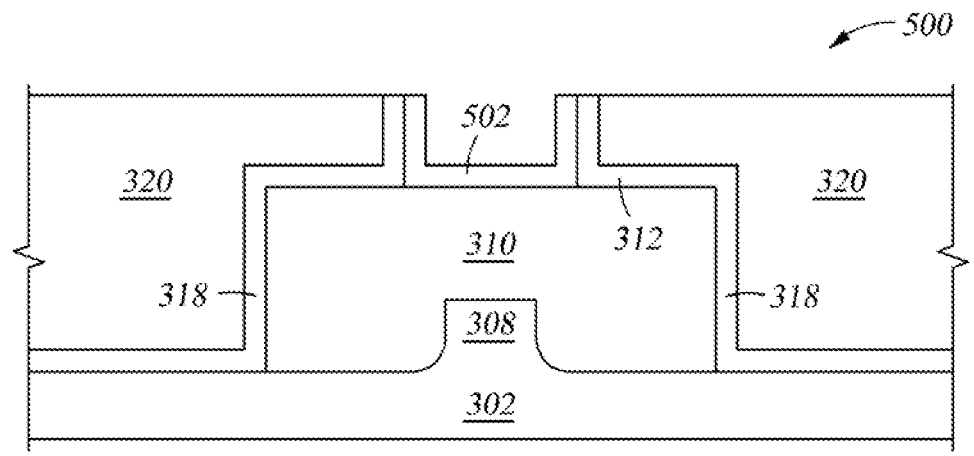
Figure 5G:
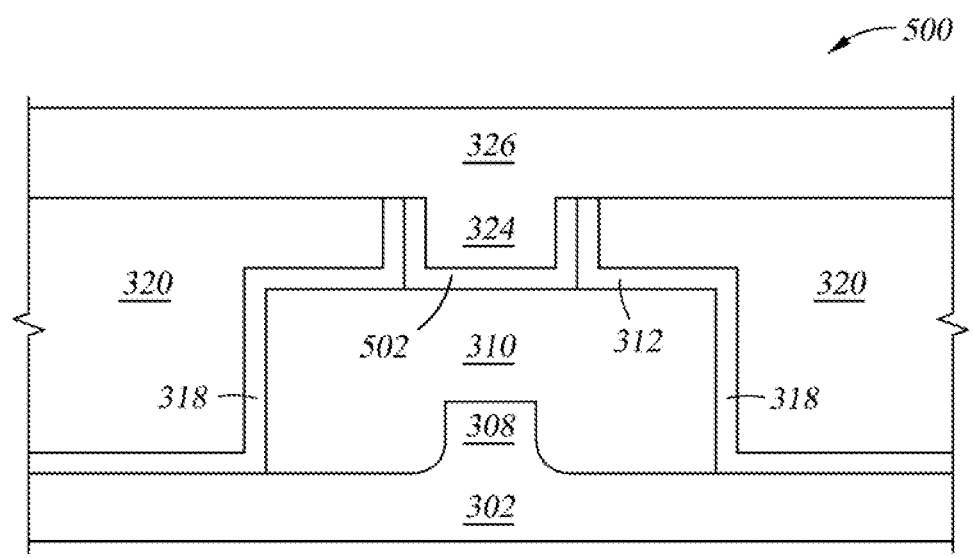

FIGS. 5A-5G are schematic illustrations of a magnetic head 500 at various stages of production according to another embodiment. The head 500 is fabricated by forming the antenna 306 having the base layer 302, and the notch 308 and the insulating layer 310 as discussed above with regards to FIGS. 3A-3H and 4A-4F and shown in FIG. 5A. The insulating layer 310 is then patterned to form the aperture 314 as shown in FIG. 5B. The resist mask 316, the conductive layer 318 and the heat sink 320 are all then formed as shown in FIG. 5C. A subtractive process, such as a CMP process or ion milling process, is performed to expose the resist mask 316 as shown in FIG. 5D. The resist mask 316 is then removed as shown in FIG. 5E to form the opening 322. The diffusion barrier layer 502 is then formed in the opening 322 as shown in FIG. 5F. The diffusion barrier layer 502 may be deposited in the same manner, to the same thickness and using the same materials as discussed above with regards to diffusion barrier layers 312 and 402. However, the diffusion barrier layer 502 is formed on only on the surfaces bounding the opening 322 such that the diffusion barrier layer 502 is on the insulating layer 310 and the conductive layer 318. Following formation of the diffusion barrier layer 502, the magnetic material is deposited to form the magnetic lip 324 and write pole 326 as shown in FIG. 5G.

By utilizing a noble metal alloy as a diffusion barrier layer in a HAMR head, oxygen from the aperture will not diffuse into the magnetic lip and cause the HAMR head to fail. The alloying element, together with the noble metal, will raise the melting point to a value that is sufficiently high to prevent the grain growth in the diffusion barrier layer or any morphological changes in the diffusion barrier layer. Additionally, because the diffusion barrier layer comprises a noble metal, the oxygen from the insulating layer will not diffuse therethrough.

While the foregoing is directed to embodiments of the present invention, other and further embodiments of the invention may be devised without departing from the basic scope thereof, and the scope thereof is determined by the claims that follow.

What is claimed is:

1. A heat assisted magnetic recording head, comprising:
   an antenna having a notch;
   an insulating layer disposed on the antenna;
   a diffusion barrier layer disposed on the insulating layer, wherein the diffusion barrier layer comprises a noble metal alloy;
   a magnetic lip comprising a magnetic material disposed on the diffusion barrier layer; and
   a heat sink thermally connected to the magnetic lip and the antenna.

2. The heat assisted magnetic recording head of claim 1, wherein the noble metal alloy diffusion barrier comprises one or more noble metal elements selected from the group consisting of Au, Ag, Pt, Ir, Re and Ru.

3. The heat assisted magnetic recording head of claim 2, wherein the noble metal alloy diffusion barrier comprises less than 10 percent of one or more alloying elements selected from the group consisting of, Rh, Ni, W, Mo, Co, Ir, Ru, B and Pt.

4. The heat assisted magnetic recording head of claim 3, wherein the insulating layer has a first surface in contact with the antenna, a second surface opposite the first surface, and side surfaces connecting the first and second surfaces, and wherein the noble metal alloy diffusion barrier layer is disposed on the second surface.

5. The heat assisted magnetic recording head of claim 4, further comprising metallic cladding material disposed on the side surfaces of the insulating layer and at least a portion of the noble metal alloy diffusion barrier layer.

6. The heat assisted magnetic recording head of claim 1, further comprising:
   a first adhesion layer disposed on top of the noble metal alloy diffusion barrier layer; and
   a second adhesion layer disposed below the noble metal alloy diffusion barrier layer, wherein the first and second adhesion layers comprise materials selected from the group consisting of: Cr, Ta, Ti, Hf, Zr, Si, or alloys of these elements with Ni.

7. The heat assisted magnetic recording head of claim 6, wherein the first and second adhesion layers comprise NiTa, NiTi, NiCr, NiHf, or NiZr.

8. The heat assisted magnetic recording head of claim 1, wherein the insulating layer has a first surface in contact with the antenna, a second surface opposite the first surface, and side surfaces connecting the first and second surfaces, and wherein the noble metal alloy diffusion barrier layer is disposed on the second surface.

9. The heat assisted magnetic recording head of claim 1, wherein the noble metal alloy has an alloying element having a melting point of greater than 1065 degrees Celsius.

10. The heat assisted magnetic recording head of claim 1, wherein the noble metal alloy diffusion barrier layer has a thickness between 5 Angstroms and 100 Angstroms.

11. A heat assisted magnetic recording head, comprising:
    an antenna having a notch;
    an insulating layer disposed on the antenna;
    a diffusion barrier layer disposed on the insulating layer and the antenna, wherein the diffusion barrier layer comprises a noble metal alloy;
    a magnetic lip comprising a magnetic material disposed on the diffusion barrier layer; and
    a heat sink thermally connected to the magnetic lip and the antenna.

12. The heat assisted magnetic recording head of claim 11, wherein the noble metal alloy diffusion barrier comprises one or more noble metal elements selected from the group consisting of Au, Ag, Pt, Ir, Re and Ru.

13. The heat assisted magnetic recording head of claim 12, wherein the noble metal alloy diffusion barrier comprises less than 10 percent of one or more alloying elements selected from the group consisting of, Rh, Ni, W, Mo, Co, Ir, Ru, B and Pt.

14. The heat assisted magnetic recording head of claim 11, further comprising cladding material disposed on the noble metal alloy diffusion barrier layer.

15. The heat assisted magnetic recording head of claim 14, wherein the noble metal alloy has an alloying element having a melting point of greater than 1065 degrees Celsius.

16. The heat assisted magnetic recording head of claim 11, wherein the noble metal alloy diffusion barrier layer has a thickness between 5 Angstroms and 100 Angstroms.

17. The heat assisted magnetic recording head of claim 11, further comprising:
    a first adhesion layer disposed on top of the noble metal alloy diffusion barrier layer; and
    a second adhesion layer disposed below the noble metal alloy diffusion barrier layer, wherein the first and second adhesion layers comprise materials selected from the group consisting of: Cr, Ta, Ti, Hf, Zr, Si, or alloys of these elements with Ni.

18. The heat assisted magnetic recording head of claim 17, wherein the first and second adhesion layers comprise NiTa, NiTi, NiCr, NiHf, or NiZr.

19. A heat assisted magnetic recording head, comprising:
    an antenna having a notch;
    an insulating layer disposed on the antenna and notch;
    a conductive layer disposed on the antenna and insulating layer, wherein the conductive layer has an opening therethrough exposing the insulating layer;
    a diffusion barrier layer disposed on the insulating layer within the opening of the conductive layer and on the conductive layer bordering the opening, wherein the diffusion barrier layer comprises a noble metal alloy;
    a magnetic lip comprising a magnetic material disposed on the diffusion barrier layer and within the opening;

a heat sink thermally connected to the magnetic lip and the antenna.

20. The heat assisted magnetic recording head of claim 19, wherein the noble metal alloy diffusion barrier comprises one or more noble metal elements selected from the group consisting of Au, Ag, Pt, Ir, Re and Ru.

21. The heat assisted magnetic recording head of claim 20, wherein the noble metal alloy comprises less than 10 percent of one or more alloying elements selected from the group consisting of, Rh, Ni, W, Mo, Co, Ir, Ru, B and Pt.

22. The heat assisted magnetic recording head of claim 21, wherein the noble metal alloy has an alloying element having a melting point of greater than 1065 degrees Celsius.

23. The heat assisted magnetic recording head of claim 19, wherein the noble metal alloy diffusion barrier layer has a thickness between 5 Angstroms and 100 Angstroms.

24. The heat assisted magnetic recording head of claim 19, further comprising:
 a first adhesion layer disposed on top of the noble metal alloy diffusion barrier layer; and
 a second adhesion layer disposed below the noble metal alloy diffusion barrier layer, wherein the first and second adhesion layers comprise materials selected from the group consisting of: Cr, Ta, Ti, Hf, Zr, Si, or alloys of these elements with Ni.

25. The heat assisted magnetic recording head of claim 24, wherein the first and second adhesion layers comprise NiTa, NiTi, NiCr, NiHf, or NiZr.

\* \* \* \* \*